(12) United States Patent
Mueller-Fiedler et al.

(10) Patent No.: US 6,259,350 B1
(45) Date of Patent: *Jul. 10, 2001

(54) SENSOR AND METHOD FOR MANUFACTURING A SENSOR

(75) Inventors: Roland Mueller-Fiedler, Leonberg; Christoph Treutler, Wannweil; Michael Gundlach, Asperg; Manfred Moellendorf, Leonberg; Steffen Schmidt, Reutlingen; Franz Laermer, Stuttgart; Christoph Kampshoff; Klaus Heyers, both of Reutlingen; Joerg Buth, Gerlingen, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/784,660

(22) Filed: Jan. 21, 1997

(30) Foreign Application Priority Data

Jan. 18, 1996 (DE) .............................. 196 01 592

(51) Int. Cl.$^7$ ...................................... H01C 3/04
(52) U.S. Cl. ................... 338/25; 338/308; 338/9
(58) Field of Search .............. 338/22 R, 225 D, 338/25, 308, 9; 73/204.26

(56) References Cited

U.S. PATENT DOCUMENTS

| | | | |
|---|---|---|---|
| 2,808,351 | * 10/1957 | Colbert et al. | 338/308 |
| 3,617,824 | * 11/1971 | Shinoda et al. | 317/235 |
| 3,800,264 | * 3/1974 | Kurtz et al. | 338/2 |
| 4,129,848 | * 12/1978 | Frank et al. | 338/308 |
| 4,888,988 | * 12/1989 | Lee et al. | 73/204.26 |
| 4,952,904 | * 8/1990 | Johnson et al. | 338/36 |
| 5,006,421 | * 4/1991 | Yang et al. | 338/308 |
| 5,108,193 | 4/1992 | Furubayashi | 374/164 |
| 5,703,287 | * 12/1997 | Treutler et al. | 73/204.26 |
| 5,716,506 | * 2/1998 | Maclay et al. | 204/424 |

FOREIGN PATENT DOCUMENTS 36 28 017 3/1987 (DE) .
0 375 399 6/1990 (EP) .

* cited by examiner

Primary Examiner—Karl D. Easthom
(74) Attorney, Agent, or Firm—Kenyon & Kenyon

(57) ABSTRACT

With a sensor and method, it is possible for platinum resistor elements to be used advantageously as heating elements, temperature sensors, printed circuit traces, or as chemically resistant electron beam sensitive layers. To ensure a long-lasting adhesion of the platinum resistance layer to a dielectric substrate, even during exposure to temperatures which are elevated over ambient temperature and under dry and most atmospheric conditions, a thin adhesion layer of platinum silicide, for example, is deposited between the platinum resistance layer and the dielectric substrate. Resistor elements patterned from the platinum layer can advantageously be used in temperature sensors, mass flow sensors, chemical sensors, gas sensors, or humidity sensors.

3 Claims, 1 Drawing Sheet

SENSOR AND METHOD FOR MANUFACTURING A SENSOR

FIELD OF THE INVENTION

The present invention relates to a sensor and a method for manufacturing a sensor.

BACKGROUND INFORMATION

A sensor having a microbridge, on which is arranged a heating element of platinum, is described in European Patent Application No. 0 375 399. Sensors of this type are preferably used as mass flow sensors. To ensure adequate adhesion of the platinum layer, out of which the heating element is patterned to the dielectric substrate, metal oxides are used for the adhesion-promoting layer between Pt and $Si_3N_4$.

SUMMARY OF THE INVENTION

One of the advantages of the sensor and the method for manufacturing a sensor according to the present invention is that an improved adhesion of the platinum layer to the dielectric substrate is achieved, which remains constant during long-term exposures to temperatures elevated (approximately greater than 250°) over ambient temperature and to high levels of atmospheric humidity. In addition, the sensor according to the present invention can be produced using especially advantageous methods.

The adhesion layer of platinum silicide (PtSi2), molybdenum silicide (MoSi2), tungsten silicide (WSi2), tantalum silicide (TaSi2), titanium silicide (TiSi2) and/or cobalt silicide (CoSi2) being used has no effect on the properties of the platinum layer, in particular on the resistance as a function of temperature. In comparison to the complicated deposition of metal oxides, the adhesion layer of metal silicide can be simply produced.

A plurality of materials, which contain silicon ($SiO_2$, $Si_3N_4$, $SiO_xN_y$, etc. in accordance with various coating methods), are suitable materials for the substrate, which can be formed as a closed membrane over an Si cavity. A thin metal silicide layer, which introduces only negligible, additional thermally produced stresses, can be successful as an adhesion layer between the substrate (membrane) and the platinum. Typical dimensions of the metal layer lie between 140 and 160 nm. As a rule, the metal silicide layer is substantially between 3 and 6 nm thick. To protect the heating element, a dielectric coating layer can be provided, with an adhesion layer of one of the metal silicides provided between the heating element and the coating layer.

DETAILED DESCRIPTION

Figure 1:
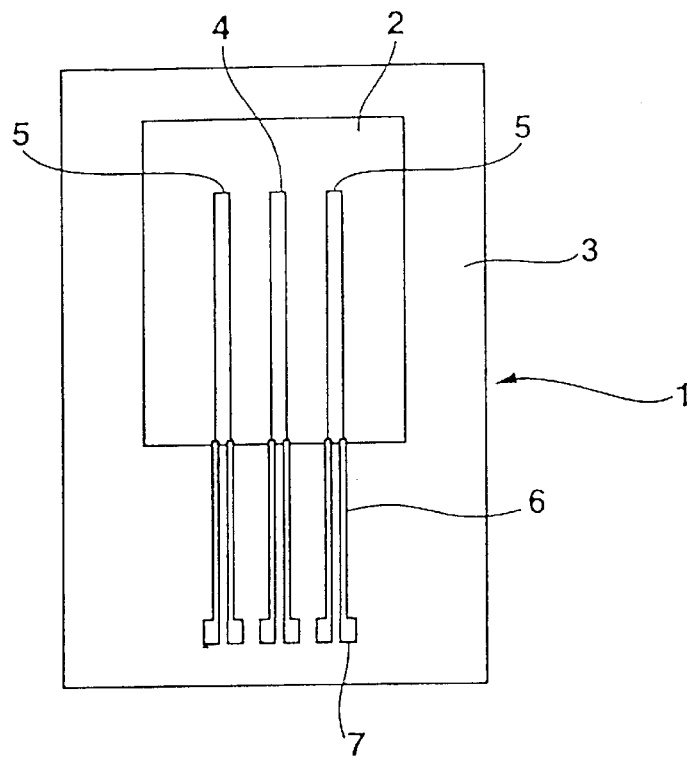
FIG. 1 shows a plan view of the sensor according to the present invention.
Figure 2:
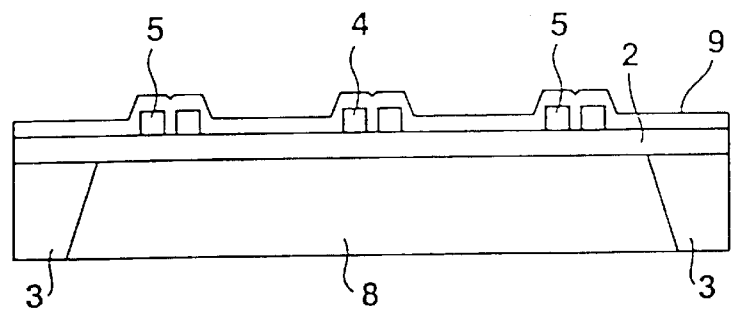
FIG. 2 shows a cross-section of the sensor illustrated in FIG. 1.

FIG. 1 shows a sensor 1, in which a membrane 2 is clamped in a frame 3 of monocrystalline silicon. A heating element 4 is arranged on membrane 2. Temperature sensors 5 are disposed on both sides of heating element 4. Heating element 4 and temperature sensors 5 are electrically connected via lead wires 6, which are arranged on frame 4. Lead wires 6 lead into terminal areas 7 onto which connecting wires can be attached for contacting heating element 4 and temperature sensor 5. FIG. 2 shows a cross-section of sensor 1 in the area of membrane 2. It reveals that frame 3 and the dimensions of membrane 2 are defined by a recess 8, which extends from the rear side of sensor 1 to membrane 2. The geometric dimensions of the heating element and of temperature sensors 5 are exaggerated in FIG. 2. A coating layer 9 is also shown on the top side, which covers the top side of membrane 2, as well as heating element 4 and temperature sensors 5.

The sensor illustrated in FIG. 2 is a mass flow sensor. Heating element 4 under temperature sensors 5 is a resistor element which is patterned from a thin platinum layer. A current is conducted through heating element 4 to heat the membrane in the vicinity of heating element 4. The temperature of the membrane can be determined at temperature sensors 5 by measuring the electrical resistance. When a flow, in particular an air flow, streams past the top side of the sensor, then heat is dissipated through the mass flow associated therewith from membrane 2. The temperature of membrane 2 is thereby reduced depending on the intensity of the flow, temperature sensors 5 arranged on both sides of heating element 4 exhibiting different temperature values depending on the direction of flow. Alternatively, it is also possible to arrange only one heating element 4 on the membrane and to verify the mass flow by measuring the resistance of this heated element.

To manufacture sensor 1, a silicon plate is provided on whose top side a membrane layer is applied. Heating elements 4 and temperature elements 5 are produced on this membrane layer, in that a platinum layer is first applied over the entire surface and is then patterned in another process step. Lead wires 6 and terminal areas 7, which differ in width from heating elements 4 and temperature sensors 5, can then be patterned at the same time from the platinum layer. Because of the greater width of printed circuit traces 6, their resistance is clearly less than that of heating element(s) 4 and temperature sensors 5. If needed, another coating layer 9 is then applied. In yet another step, a recess 8, which extends up to membrane 2, is introduced from the rear side of the silicon plate. A plurality of sensors of this type is able to be produced on a silicon wafer, which is then diced into a multiplicity of individual sensors 1.

Figure 3:
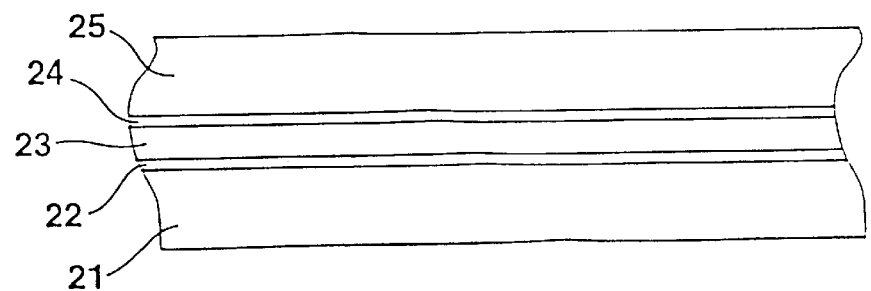
FIG. 3 shows an enlarged cross-section through a membrane of the sensor according to the present invention.

FIG. 3 shows an enlarged cross-section through a membrane in the area of heating element 4. Membrane 2 is formed by a dielectric membrane layer 21. This dielectric membrane layer 21 can be composed of, for example, of a silicon oxide, a silicon dioxide, a silicon nitride, a silicon oxynitride, a silicon carbide (SiC) or of at least two of these layers in a sandwich-type sequence. These materials are particularly well suited for membranes, which are clamped across a frame of monocrystalline silicon. However, other materials can be suitable, such as ceramic materials or glass. A layer sequence with silicon oxide as a last layer is preferable, which is able to be produced using simple means and with a particularly good quality on the surface of silicon plates. An adhesion-promoting layer 22 of platinum silicide (PtSi2), molybdenum silicide (MoSi2), tungsten silicide (WSi2), tantalum silicide (TaSi2), titanium silicide (TiSi2) or cobalt silicide (CoSi2) is provided on membrane layer 21. Platinum layer 23 is then arranged on layer 22 of platinum silicide (PtSi2), molybdenum silicide (MoSi2), tungsten silicide (WSi2), tantalum silicide (TaSi2), titanium silicide (TiSi2) or cobalt silicide (CoSi2). If desired, heating element 4 and temperature sensors 5, if present, can also be provided with a coating layer. The coating layer is made up in this case of a dielectric layer 25, for which, in some instances, an adhesion-promoting layer 24 of platinum silicide (PtSi2), molybdenum silicide (MoSi2), tungsten silicide (WSi2), tantalum silicide (TaSi2), titanium silicide (TiSi2) or cobalt silicide (CoSi2) is provided.

In a preferred exemplary embodiment according to the present invention, a platinum silicide layer is used. Silicon oxide layer 21 can be produced, for example, through thermal oxidation of the surface of a silicon plate. Thermal oxide layers of this type are of an especially high quality. The adhesive-promoting silicide layer 22 can be produced by first depositing a thin silicon layer on silicon oxide layer 21. This can be vaporized through sputtering, or by applying an electron beam, or through a chemical deposition out of the gas phase. Suited for the chemical deposition are processes for depositing thin polysilicon layers. The thickness of the formed silicon layer amounts to a few nm, preferably 5 nm. A platinum layer 23 is then applied in another process step. By means of an annealing process, i.e., by heating the layers to temperatures of more than 500° C. a platinum silicide layer is then formed. The originally applied silicon layer is thereby converted, partially or completely, by reacting with the deposited platinum, into a platinum silicide layer. Since the layer thickness of platinum layer 23 is greater than 100 nm, only a small portion of the deposited platinum is consumed to form the platinum silicide. Thus, the platinum layer that remains has ample thickness for the heating element or for the temperature sensor. The silicon layer can be converted into a platinum silicide layer immediately following the deposition of the platinum layer, after patterning of the platinum layer, or following the deposition of a coating layer. FIG. 3 shows another adhesion layer 24 of platinum silicide and, arranged thereon, a silicon oxide layer 25, which acts as a coating layer. Platinum silicide layer 24 is likewise formed through deposition of a thin silicon layer, which reacts with the platinum material of platinum layer 23. Alternatively, it is also possible to deposit platinum silicide layers 22 and 24 directly by means of sputtering deposition (sputtering from the Pt—Si target, co-sputtering of Si and Pt, or reactive sputtering of Pt in silane gas) or through the electron beam vaporization of platinum silicide.

The preferred manufacturing of the laminate structure as shown in FIG. 3 is based on thermally oxidizing the surface of a silicon wafer until a layer thickness of approximately 500 nm thermal oxide is grown. In a sputtering installation, 5 nm silicon, thereupon 150 nm platinum, and thereupon, in turn, 5 nm silicon are then sputter-deposited. A photoresist is subsequently applied, patterned using a lithographic process, and the produced structure is then transformed using a plasma-etching process into the layered (sandwich) packet which includes an upper silicon layer, a platinum layer, and a bottom silicon layer. This can take place, for example, in a plasma-etching process using ion-beam etching. In yet another process step, an approximately 400 nm thick silicon oxide layer is produced through chemical vapor deposition. An annealing process follows, in which the sequence of layers is heated to temperatures of more than 500° C., and preferably over 650° C. In this annealing process, the silicon layers are converted into a platinum silicide layer, a portion of the platinum layer being consumed. In addition, the properties of the platinum layer are advantageously influenced in this annealing process. When working with the measuring principle of the sensor, it is beneficial for the temperature dependency of the platinum layer resistance to be adjusted as accurately and as reproducibly as possible. This is achieved through the annealing process. This also ensures that the thus produced temperature coefficient of the resistance and the resistance itself are stabilized for a long period of time, i.e. any variation in this temperature coefficient or in the resistance is diminished over time (several thousand operating hours). Experiments have shown that platinum silicide has only a slight effect on the long-term stability of the platinum-layer properties.

It is not only possible to produce bottom layer 21 from one material, but also as a sequence of different dielectric materials, for example, of one layer of silicon oxide and one layer of silicon nitride.

Manufacturing of sensors with molybdenum silicide (MoSi2), tungsten silicide (WSi2), tantalum silicide (TaSi2), titanium silicide (TiSi2) or cobalt silicide (CoSi2) is carried out in a manner corresponding to the manufacture of the sensor with a platinum silicide layer, differing in that these layers cannot be formed by converting a thin silicon layer with the platinum of the heating element or the temperature sensor. Therefore, the layers are deposited directly by vapor deposit, deposit by sputtering or chemical deposition. The manufacture is particularly simple when, starting out from the target of a metal silicide, deposition is carried out by sputtering. One of the advantages of molybdenum silicide (MoSi2), tungsten silicide (WSi2), tantalum silicide (TaSi2), titanium silicide (TiSi2) and cobalt silicide (CoSi2), as compared to the platinum silicide layer, is having a very high temperature stability, so that the sensor can be annealed with high temperatures up to 1300° C. In so doing, there is no possibility of a diffusion of silicon in the platinum layer which could impair the temperature dependence of the electrical resistance in the platinum layer.

What is claimed is:

1. A resistor element sensor comprising:

a substrate;

a dielectric membrane disposed on the substrate;

a platinum layer disposed on the membrane and providing a resistance;

at least one sensing element disposed on the substrate; and a first adhesion layer composed of at least one of a platinum silicide, a molybdenum silicide, a tungsten silicide, a tantalum silicide, a titanium silicide and a cobalt silicide, the first adhesion layer being disposed between the platinum layer and the membrane, wherein the platinum layer has a thickness of between 100 and 200 nm, and the first adhesion layer has a thickness of between 2 and 8 nm.

2. A resistor element sensor comprising:

a substrate;

a dielectric membrane disposed on the substrate;

a platinum layer disposed on the membrane and providing a resistance;

at least one sensing element disposed on the substrate; and a first adhesion layer composed of at least one of a platinum silicide, a molybdenum silicide, a tungsten silicide, a tantalum silicide, a titanium silicide and a cobalt silicide, the first adhesion layer being disposed between the platinum layer and the membrane, wherein the first adhesion layer has a thickness of between 3 and 6 nm.

3. A resistor element sensor comprising:

a substrate;

a dielectric membrane disposed on the substrate;

a platinum layer disposed on the membrane and providing a resistance;

at least one sensing element disposed on the substrate; and a first adhesion layer composed of at least one of a molybdenum silicide, a tungsten silicide, a tantalum silicide, a titanium silicide and a cobalt silicide, the first adhesion layer being disposed between the platinum layer and the membrane, wherein the membrane includes a first top side, and wherein the platinum layer includes a second top side, and further comprising:

a coating layer covering the first top side of the membrane and the second top side of the platinum layer; and a second adhesion layer composed of at least one of the platinum silicide, molybdenum silicide, tungsten silicide, tantalum silicide, titanium silicide and cobalt silicide, the second adhesion layer being disposed between the platinum layer and the coating layer.

* * * * *